United States Patent
Baumann

(10) Patent No.: US 9,843,280 B2
(45) Date of Patent: Dec. 12, 2017

(54) MOTOR CONTROLLER AND METHOD FOR THE FIELD-ORIENTED CONTROL OF AN ELECTRIC MOTOR

(71) Applicant: Continental Automotive GmbH, Hannover (DE)

(72) Inventor: Thomas Baumann, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 194 days.

(21) Appl. No.: 14/435,363

(22) PCT Filed: Oct. 4, 2013

(86) PCT No.: PCT/EP2013/070706
§ 371 (c)(1),
(2) Date: Apr. 13, 2015

(87) PCT Pub. No.: WO2014/056799
PCT Pub. Date: Apr. 17, 2014

(65) Prior Publication Data
US 2015/0295527 A1    Oct. 15, 2015

(30) Foreign Application Priority Data
Oct. 12, 2012   (DE) .................. 10 2012 218 612

(51) Int. Cl.
*H02P 9/08*        (2006.01)
*B60W 10/18*       (2012.01)
(Continued)

(52) U.S. Cl.
CPC ............... *H02P 7/28* (2013.01); *B60L 15/20* (2013.01); *H02P 6/34* (2016.02); *H02P 29/02* (2013.01); *Y02T 10/7258* (2013.01)

(58) Field of Classification Search
CPC ....... B60W 10/08; B60W 10/06; B60W 10/02
See application file for complete search history.

(56) References Cited

U.S. PATENT DOCUMENTS 8,294,430 B2   10/2012   Heier et al. .................. 322/29
8,295,954 B2   10/2012   Bonefeld et al. ............. 700/52
(Continued)

FOREIGN PATENT DOCUMENTS

CN       1953923 A     4/2007   ............. B66B 1/30
CN     102710205 A    10/2012   ............. H02P 21/06
(Continued)

OTHER PUBLICATIONS

Chinese Office Action, Application No. 201380053369.2, 14 pages, dated Aug. 1, 2016.
(Continued)

*Primary Examiner* — Eduardo Colon Santana
*Assistant Examiner* — Charles S Laughlin
(74) *Attorney, Agent, or Firm* — Slayden Grubert Beard PLLC

(57) ABSTRACT

A motor control system is provided for field-oriented control of an electric motor for driving a vehicle. The motor control system includes a current setpoint creator, which is designed to receive a torque setpoint as an input signal and to output a torque-creating current setpoint and at least one field-creating current setpoint as output signals in order to control the electric motor in a field-oriented manner. An exceptional situation detection device detects a present torque setpoint, calculates a change based on the present torque setpoint and an earlier torque setpoint, and detects an exceptional situation if the magnitude of the change exceeds a specified threshold value. The motor control system is designed to adapt the torque-creating current setpoint based on the present torque setpoint when the exceptional situation is detected, thereby bypassing the current setpoint creator.

16 Claims, 4 Drawing Sheets

(51) Int. Cl.
*H02P 7/28* (2016.01)
*H02P 29/02* (2016.01)
*B60L 15/20* (2006.01)
*H02P 6/34* (2016.01)

(56) References Cited

U.S. PATENT DOCUMENTS

| | | | | |
|---|---|---|---|---|
| 8,977,433 | B2 | 3/2015 | Kojima | 701/41 |
| 9,050,906 | B2 | 6/2015 | Ito et al. | |
| 2012/0046832 | A1* | 2/2012 | Kariatsumari | B62D 5/0463 |
| | | | | 701/41 |
| 2013/0144479 | A1* | 6/2013 | Ito | B60L 3/00 |
| | | | | 701/22 |
| 2013/0207589 | A1 | 8/2013 | Margner et al. | 318/717 |
| 2013/0261894 | A1* | 10/2013 | Kojima | B62D 5/0463 |
| | | | | 701/41 |
| 2013/0320891 | A1 | 12/2013 | Merkel et al. | 318/400.02 |

FOREIGN PATENT DOCUMENTS

| | | | | |
|---|---|---|---|---|
| CN | 102712340 | A | 10/2012 | B62D 5/04 |
| DE | 102006062591 | A1 | 7/2008 | G05D 17/00 |
| DE | 102008011111 | A1 | 1/2009 | G05B 13/04 |
| DE | 102007035570 | A1 | 2/2009 | H02P 9/02 |
| DE | 102010043492 | A1 | 5/2012 | H02P 21/00 |
| DE | 102010061897 | A1 | 5/2012 | H02P 1/30 |
| JP | EP 1880966 | A1 * | 1/2008 | B66B 1/28 |
| WO | 2012/011437 | A1 | 1/2012 | B60L 15/20 |
| WO | 2014/056799 | A2 | 4/2014 | H02P 21/00 |

OTHER PUBLICATIONS

International Search Report and Written Opinion, Application No. PCT/EP2013/070706, 14 pages, dated Aug. 26, 2014.

* cited by examiner ial Stage Application of
MOTOR CONTROLLER AND METHOD FOR THE FIELD-ORIENTED CONTROL OF AN ELECTRIC MOTOR

CROSS-REFERENCE TO RELATED APPLICATIONS

This application is a U.S. National Stage Application of International Application No. PCT/EP2013/070706 filed Oct. 4, 2013, which designates the United States of America, and claims priority to DE Application No. 10 2012 218 612.3 filed Oct. 12, 2012, the contents of which are hereby incorporated by reference in their entirety.

TECHNICAL FIELD

The present invention relates to a motor controller and to a corresponding method for the field-oriented control of an electric motor for driving a vehicle.

BACKGROUND

The drive for modern motor vehicles is increasingly involving the use of electric machines as a sole drive or in unison with a drive of another type (hybrid drive). The electric machine is normally actuated by means of power electronics, which comprise an inverter that takes the DC voltage from a high-voltage battery on board the motor vehicle and produces an alternating current. Such inverters are frequently controlled on a field-oriented basis. Such control is also called vector control. In this case, provision may be made for a space vector (for example a current vector) to be moved that rotates with the driveshaft of the electric machine. In other words, this converts the phase currents used for actuating the electric machine into a coordinate system that is fixed with respect to the rotor and that co-rotates with the magnetic field of the machine. Such a coordinate system is frequently referred to as a dq system. In the case of field-oriented control, the current components $I_d$ and $I_q$ transformed in this manner are then controlled instead of the phase currents. $I_q$ can also be referred to as a torque-forming setpoint current value and $I_d$ can also be referred to as a field-forming setpoint current value in this case. In the case of a separately excited synchronous machine, an additional field-forming setpoint current value ($I_e$) can also be used.

A field-oriented actuation method is disclosed in DE 10 2010 061 897 A1, for example.

In the case of field-oriented control systems, a setpoint current value forming unit is normally used. This receives a setpoint torque value as an input signal. Said setpoint torque value is ultimately prescribed by the driver by means of the gas pedal, the position of which is sensed and converted into a setpoint torque value. This involves any maximum values and maximum gradients being taken into account in order to prevent overloads on the electric motor or oscillations.

The setpoint torque value needs to be provided by the motor controller. For this purpose, said motor controller computes a torque-forming setpoint current value and at least one field-forming setpoint current value so as to control the electric motor on a field-oriented basis. The torque-forming setpoint current value and the at least one field-forming setpoint current value are usually coordinated with one another such that an optimized operating point is obtained by which the electric power is converted into mechanical energy as efficiently as possible. For this purpose, the setpoint current value forming unit can either have online optimization with respect to the respective operating point, i.e. the operating point is recalculated each time, or it can use stored tables or formulae to query optimized operating points offline. The computation complexity for both methods is not negligible in this case, as a result of which the computation is executed relatively slowly in relation to the speed of the field-oriented control. In normal driving states, such as acceleration and braking, the computation speed is totally adequate, however, especially since sudden changes in the setpoint torque value characteristic need to be avoided in order to avoid bucking in the drive train, which is suspended so as to be capable of oscillation.

SUMMARY

One embodiment provides a motor controller for the field-oriented control of an electric motor for driving a vehicle, having: a setpoint current value forming unit that is configured to receive a setpoint torque value as an input signal and to output a torque-forming setpoint current value and at least one field-forming setpoint current value as output signals in order to control the electric motor on a field-oriented basis, and an exception situation identification device for capturing a present setpoint torque value, computing a change based on the present setpoint torque value and an earlier setpoint torque value and identifying an exception situation when an absolute value of the change exceeds a prescribed threshold value, wherein the motor controller is configured to adjust the torque-forming setpoint current value based on the present setpoint torque value, by bypassing the setpoint current value forming unit, when the exception situation is identified.

In a further embodiment, the motor controller has a setpoint torque value retaining device for supplying the present setpoint torque value to the setpoint current value forming unit as an input signal when the exception situation identification device does not identify an exception situation and for supplying a frozen setpoint torque value to the setpoint current value forming unit as an input signal when the exception situation identification device identifies the exception situation, wherein the frozen setpoint torque value is initialized at the earlier setpoint torque value.

In a further embodiment, the setpoint torque value retaining device is configured to keep the frozen setpoint torque value constant or to adjust the frozen setpoint torque value based on the present setpoint torque value.

In a further embodiment, the exception situation identification device is configured to identify that an exception situation no longer obtains when the present setpoint torque value is within a tolerance range around the frozen setpoint torque value.

In a further embodiment, the motor controller has a ratio computation device for computing a ratio between the frozen and present setpoint torque values.

In a further embodiment, the motor controller has an adjusting device for adjusting the torque-forming setpoint current value that is output by the setpoint current value forming unit by the ratio between the frozen and present setpoint torque values.

Another embodiment provides a method for the field-oriented control of an electric motor for driving a vehicle by means of a motor controller having a setpoint current value forming unit that is configured to receive a setpoint torque value as an input signal and to output a torque-forming setpoint current value and at least one field-forming setpoint current value as output signals in order to control the electric motor on a field-oriented basis, wherein the method comprises the steps of: capture of a present setpoint torque value, computation of a change based on the present setpoint torque value and an earlier setpoint torque value, identification of an exception situation when an absolute value of the change exceeds a prescribed threshold value, and adjustment of the torque-forming setpoint current value based on the present setpoint torque value, by bypassing the setpoint current value forming unit, when the exception situation is identified.

In a further embodiment, the method includes the steps of: supply of the present setpoint torque value to the setpoint current value forming unit as an input signal when an exception situation is not identified, and supply of a frozen setpoint torque value to the setpoint current value forming unit as an input signal when the exception situation is identified, wherein the frozen setpoint torque value is initialized at the earlier setpoint torque value.

In a further embodiment, the step of adjustment of the torque-forming setpoint current value by bypassing the setpoint current value forming unit comprises the step of computation of a ratio between the frozen and present setpoint torque values.

In a further embodiment, the step of adjustment of the torque-forming setpoint current value by bypassing the setpoint current value forming unit comprises the step of adjustment of the torque-forming setpoint current value that is output by the setpoint current value forming unit by the ratio between the frozen and present setpoint torque values.

BRIEF DESCRIPTION OF THE DRAWINGS

Example embodiments of the invention are explained in more detail below with reference to the figures, in which.

DETAILED DESCRIPTION

Figure 1:
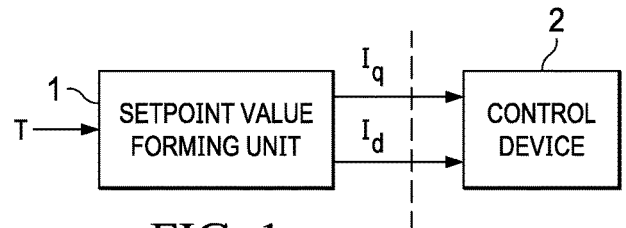
FIG. 1 shows a motor controller according to the prior art.

Embodiments of the present invention specify a motor controller for the field-oriented control of an electric motor for driving a vehicle, which motor controller is improved in at least one respect, and an associated method for field-oriented control.

Embodiments of the invention provide a motor controller for the field-oriented control of an electric motor for driving a vehicle, having a setpoint current value forming unit that is configured to receive a setpoint torque value as an input signal and to output a torque-forming setpoint current value or at least one field-forming setpoint current value as an output signal in order to control the electric motor on a field-oriented basis. The motor controller comprises an exception situation identification device for capturing a present setpoint torque value, computing a change based on the present setpoint torque value and an earlier setpoint torque value and identifying an exception situation when an absolute value of the change exceeds a prescribed threshold value. By way of example, the exception situation identification can be clocked, in which case the earlier setpoint torque value corresponds to the present setpoint torque value of the clock cycle that precedes the present clock cycle, for example. The motor controller may be configured to adjust the torque-forming setpoint current value based on the present setpoint torque value, by bypassing the setpoint current value forming unit, when the exception situation is identified.

In this way, the electric motor can be controlled very dynamically because the slow computation of optimized operating points is circumvented by the setpoint current value forming unit. This is particularly advantageous for action by the antilock braking system (ABS) or the electronic stability program (ESP).

ABS and ESP make very high demands on the dynamics of control, since they typically reduce the torque demands abruptly and release them again a short time later. The setpoint torque value is thus lowered by ABS and ESP for a short time and then increased to the original value again. If such action were to be taken via the setpoint current value forming unit, both the reduction in the torque and the subsequent re-elevation would be slowed down. In this case, the delay in the reconstruction of the torque by the setpoint current value forming unit can be brought about by delayed flow buildup in the asynchronous machine, by delayed excitation current buildup in the separately excited synchronous machine and by limited voltage reserves for the current buildup in all machine types, for example. If the setpoint current value forming unit is bypassed then, although an optimum operating point is not normally established, particularly dynamic control of the electric motor becomes possible.

In this case, a change based on the present (captured) setpoint torque value and an earlier (captured) setpoint torque value may be a difference between the present setpoint torque value and an earlier setpoint torque value, for example. Alternatively, the change based on the present setpoint torque value and an earlier setpoint torque value may also be a first derivative with respect to time for a setpoint torque value function. The change can also be specified as a percentage or per unit time, for example. In this case, the difference would then be correlated to the present or earlier setpoint torque value or to a period of time that has elapsed between reception of the earlier setpoint torque value and reception of the present setpoint torque value, for example.

In one embodiment, the motor controller according to the invention comprises a setpoint torque value retaining device for supplying the present setpoint torque value to the setpoint current value forming unit as an input signal when the exception situation identification device does not identify an exception situation, and for supplying a frozen setpoint torque value to the setpoint current value forming unit as an input signal when the exception situation identification device identifies the exception situation, wherein the frozen setpoint torque value is initialized at the earlier setpoint torque value.

The setpoint torque value retaining device thus results in the state of the setpoint current value forming unit being kept stable in an exception situation. This also avoids changes in the field-forming currents, inter alia.

In this case, the setpoint torque value retaining device may be configured to keep the frozen setpoint torque value constant, or to adjust it based on the present setpoint torque value, over the course of time. By way of example, it would be conceivable for this to involve the frozen setpoint torque value being allowed to slowly follow the present setpoint torque value in a ramp-like or filter-like manner.

The exception situation identification device may be configured to identify that an exception situation no longer obtains when the present setpoint torque value is within a tolerance range around the frozen setpoint torque value. By way of example, it can be assumed that an exception situation no longer obtains when the present setpoint torque value is below a product of the frozen setpoint torque value and a lower tolerance threshold value or above a product of the frozen setpoint torque value and an upper tolerance threshold value. By way of example, the lower tolerance threshold value may be 99%, 98%, 95% or 90%. Accordingly, the upper tolerance threshold value may reside particularly at 101%, 102%, 105% or 110%. In this way, the exception situation identification device can identify that the ABS or ESP has terminated its action.

In one embodiment, the motor controller according to the invention comprises a ratio computation device for computing a ratio between the frozen and present setpoint torque values. Furthermore, it can comprise an adjusting device for adjusting the torque-forming setpoint current value that is output by the setpoint current value forming unit by the ratio between the frozen and present setpoint torque values.

This allows the state of the setpoint current value forming unit to be kept constant, as a result of which the torque-forming setpoint current value that is output by the setpoint current value forming unit remains stable. This stable torque-forming setpoint current value is then adjusted outside the setpoint current value forming unit to suit the ratio between the frozen and present setpoint torque values.

In addition, the invention comprises a method for the field-oriented control of an electric motor for driving a vehicle by means of a motor controller having a setpoint current value forming unit that is configured to receive a setpoint torque value as an input signal and to output a torque-forming setpoint current value and at least one field-forming setpoint current value as output signals in order to control the electric motor on a field-oriented basis. The method according to the invention can comprise the following steps. A present setpoint torque value is captured and the present setpoint torque value and an earlier setpoint torque value are taken as a basis for computing a change. An exception situation is identified when an absolute value of the change exceeds a prescribed threshold value. When an exception situation is identified, the torque-forming setpoint current value is adjusted based on the present setpoint torque value by bypassing the setpoint current value forming unit. This allows particularly dynamic field-oriented control of the electric motor.

In one embodiment, the method according to the invention comprises the steps of supply of the present setpoint torque value to the setpoint current value forming unit as an input signal when an exception situation is not identified, and supply of a frozen setpoint torque value to the setpoint current value forming unit as an input signal when the exception situation is identified, wherein the frozen setpoint torque value is initialized at the earlier setpoint torque value. This frozen setpoint torque value can be kept constant, or adjusted based on the present setpoint torque value, in the further course of control.

The method may also comprise the step of identification that an exception situation no longer obtains when the present setpoint torque value is within a tolerance range around the frozen setpoint torque value.

In one embodiment, the step of adjustment of the torque-forming setpoint current value by bypassing the setpoint current value forming unit comprises the step of computation of a ratio between the frozen and present setpoint values. Furthermore, this step of adjustment can comprise the step of adjustment of the torque-forming setpoint current value that is output by the setpoint current value forming unit by the ratio between the frozen and present setpoint torque values.

FIG. 1 shows field-oriented control according to the prior art. This control comprises a setpoint current value forming unit 1. The latter receives a setpoint torque value T as an input signal and outputs a torque-forming setpoint current value $I_q$ and a field-forming setpoint current value $I_d$ as output signals. In the case of a separately excited synchronous machine, the field-forming setpoint current value $I_e$ is additionally used. The torque-forming setpoint current value $I_q$ and the field-forming setpoint current value $I_d$ are transferred to a field-oriented control device 2 that controls the electric motor as appropriate.

In this case, the setpoint current value forming unit 1 performs its computations comparatively slowly. A typical computation time for the torque-forming setpoint current value $I_q$ and the field-forming setpoint current value $I_d$ can be 10 milliseconds, for example. By contrast, the field-oriented control device 2 computes the control values relatively quickly, e.g. within 100 microseconds.

Figure 2:
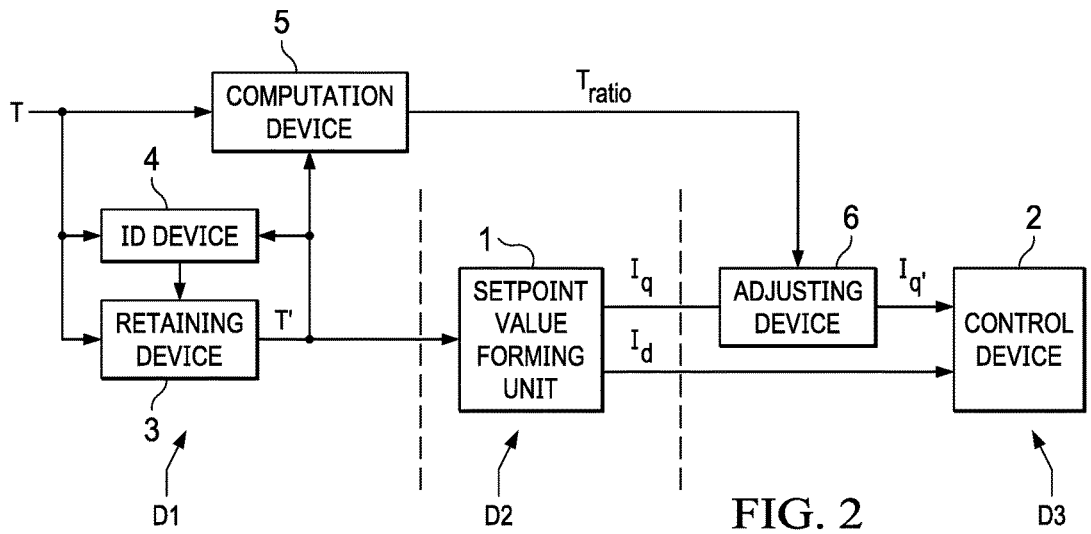
FIG. 2 shows a motor controller according to an embodiment of the present invention.

FIG. 2 shows an embodiment of a motor controller for the field-oriented control of an electric motor for driving a vehicle. Said motor controller again comprises a setpoint current value forming unit 1, which outputs a torque-forming setpoint current value $I_q$ and field-forming setpoint current value $I_d$, and a field-oriented control device 2. The setpoint torque value T is not obtained by the setpoint current value forming unit 1 directly, however, but rather is obtained via a setpoint torque value retaining device 3. This setpoint torque value retaining device 3 is connected to an exception situation identification device 4 that is configured to capture the present setpoint torque value T and to compute a change based on the present setpoint torque value and an earlier setpoint torque value. When a magnitude of the change exceeds a prescribed threshold value, the exception situation identification device 4 identifies an exception situation, which is reported to the setpoint torque value retaining device 3. When an exception situation does not obtain, the setpoint torque value retaining device 3 supplies the present setpoint torque value T to the setpoint current value forming unit 1. In the case of an exception situation, the setpoint torque value retaining device 3 freezes the setpoint torque value and supplies the frozen setpoint torque value to the setpoint current value forming unit as an input signal. The frozen setpoint torque value T' can either be kept constant or adjusted based on the present setpoint torque value T over the next few cycles. By way of example, the frozen setpoint torque value can follow the present setpoint torque value in a ramp-like or filter-like manner.

The frozen setpoint torque value is passed not only to the setpoint current value forming unit 1 but additionally also to the exception situation identification device 4 so that the latter can identify that an exception situation no longer obtains when the present setpoint torque value T is within a tolerance range around the frozen setpoint torque value T'.

The embodiment shown for a motor controller additionally comprises a ratio computation device 5 that receives the setpoint torque value T and the frozen setpoint torque value T' and computes a ratio between the frozen and present setpoint torque values $T_{ratio}$ therefrom. The corresponding ratio $T_{ratio}$ is passed from the ratio computation device 5 to an adjusting device 6 that adjusts the torque-forming setpoint current value $I_q$ that is output by the setpoint current value forming unit 1 based on the ratio between the frozen and present setpoint torque values. This results in an adjusted torque-forming setpoint current value $I_q'$ that is passed to the field-oriented control device 2.

If an exception situation does not obtain, the following relationships are thus obtained:

$$T'=T$$

$$T_{ratio}=1$$

$$I_q'=I_q$$

In the case of an exception situation, the following is true:
T' is constant or follows the present setpoint torque value slowly.

$$T_{ratio}=T/T'$$

$$I_q=I_q*T_{ratio}$$

FIG. 2 indicates three domains D1, D2 and D3. In domain D2, comparatively slow computation takes place. In domains D1 and D3, the computations take place comparatively quickly, which means that bypassing domain D2 allows very dynamic adjustment of the torque-forming setpoint current value $I_q'$.

Figure 3A:
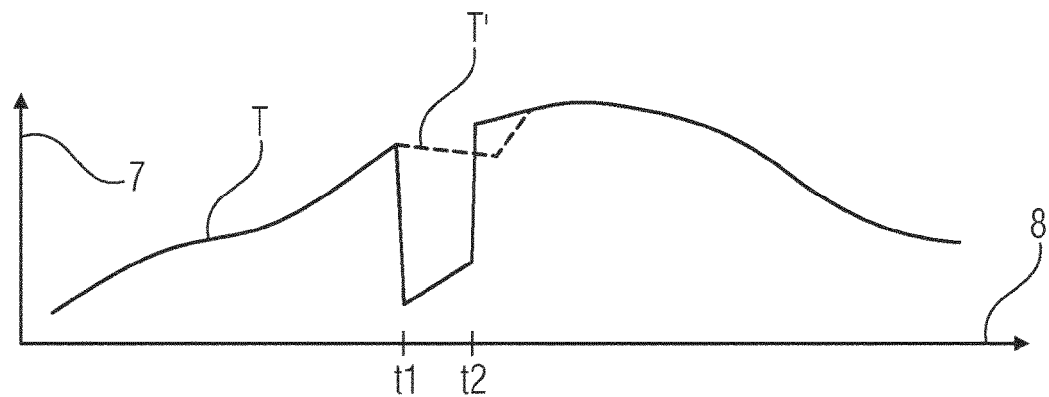
FIG. 3a shows a possible setpoint torque value characteristic over time.

FIG. 3a shows a possible characteristic for the setpoint torque value T over time. Thus, the ordinate axis 7 plots the setpoint torque value T and the abscissa axis 8 plots the time. At the instant t1, the ABS acts, for example, and drastically reduces the torque setpoint value T. The exception situation identification device 4 identifies an exception situation and freezes the setpoint torque value. The frozen setpoint torque value T' is shown in a dashed line and follows the present setpoint torque value slowly. At the instant t2, the ABS terminates its action and accordingly releases the setpoint torque value again, so that said setpoint torque value approximately reaches the level prior to the action.

Figure 3B:
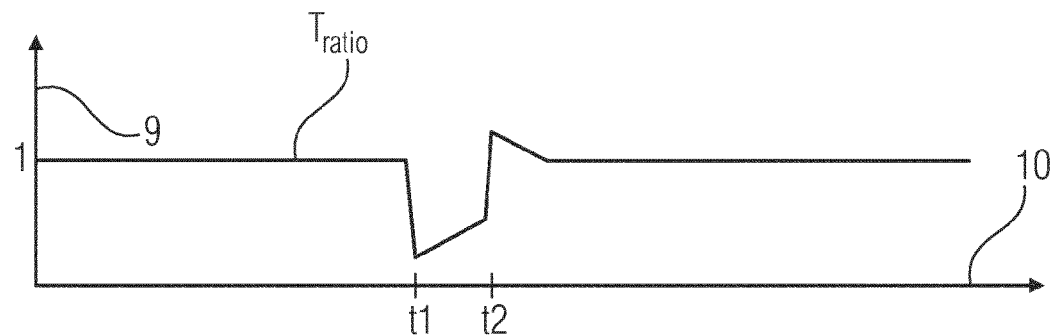
FIG. 3b shows a possible characteristic for a ratio between the frozen and present setpoint torque values over time.

FIG. 3b shows the ratio $T_{ratio}$ between the frozen setpoint torque value T' and the present setpoint torque value for the scenario shown in FIG. 3a. Thus, the ordinate axis 9 plots the ratio $T_{ratio}$ and the abscissa axis 10 plots the time. Before t1, the ratio $T_{ratio}$ is 1. At the instant t1, this ratio $T_{ratio}$ falls significantly and is a little above 1 at the instant t2, since the frozen setpoint torque value T' had followed the present setpoint torque value T slightly and the present setpoint torque value T is now approximately at the level that it had before the ABS action.

Figure 4:
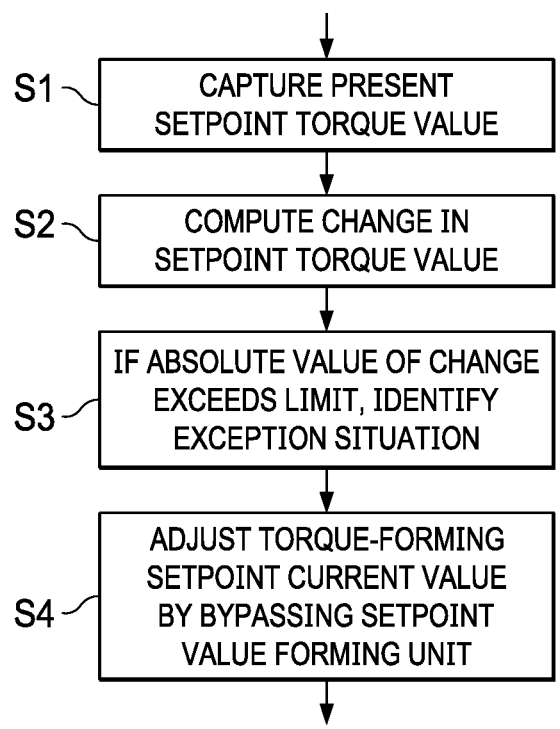
FIG. 4 shows a first embodiment of a method.

FIG. 4 shows a first embodiment of a method for the field-oriented control of an electric motor for driving a vehicle by means of a motor controller having a setpoint current value forming unit that is configured to receive a setpoint torque value T as an input signal and to output a torque-forming setpoint current value $I_q$ and at least one field-forming setpoint current value $I_d$ as output signals in order to control the electric motor on a field-oriented basis. The first embodiment shown for a method comprises the following steps: In step S1, a present setpoint torque value T is captured. In step S2, the present setpoint torque value T and an earlier setpoint torque value are taken as a basis for computing a change. By way of example, the method can proceed in clocked fashion. With such clocking, the earlier setpoint torque value would then correspond to the present setpoint torque value from the last clock cycle, for example. In step S3, an exception situation is identified when an absolute value of the change exceeds a prescribed threshold value. In this way, it is possible to identify the action of an ABS or ESP, for example. In step S4, the torque-forming setpoint current value is then adjusted based on the present setpoint torque value by bypassing the setpoint current value forming unit, provided that an exception situation has been identified in step S3.

Figure 5:
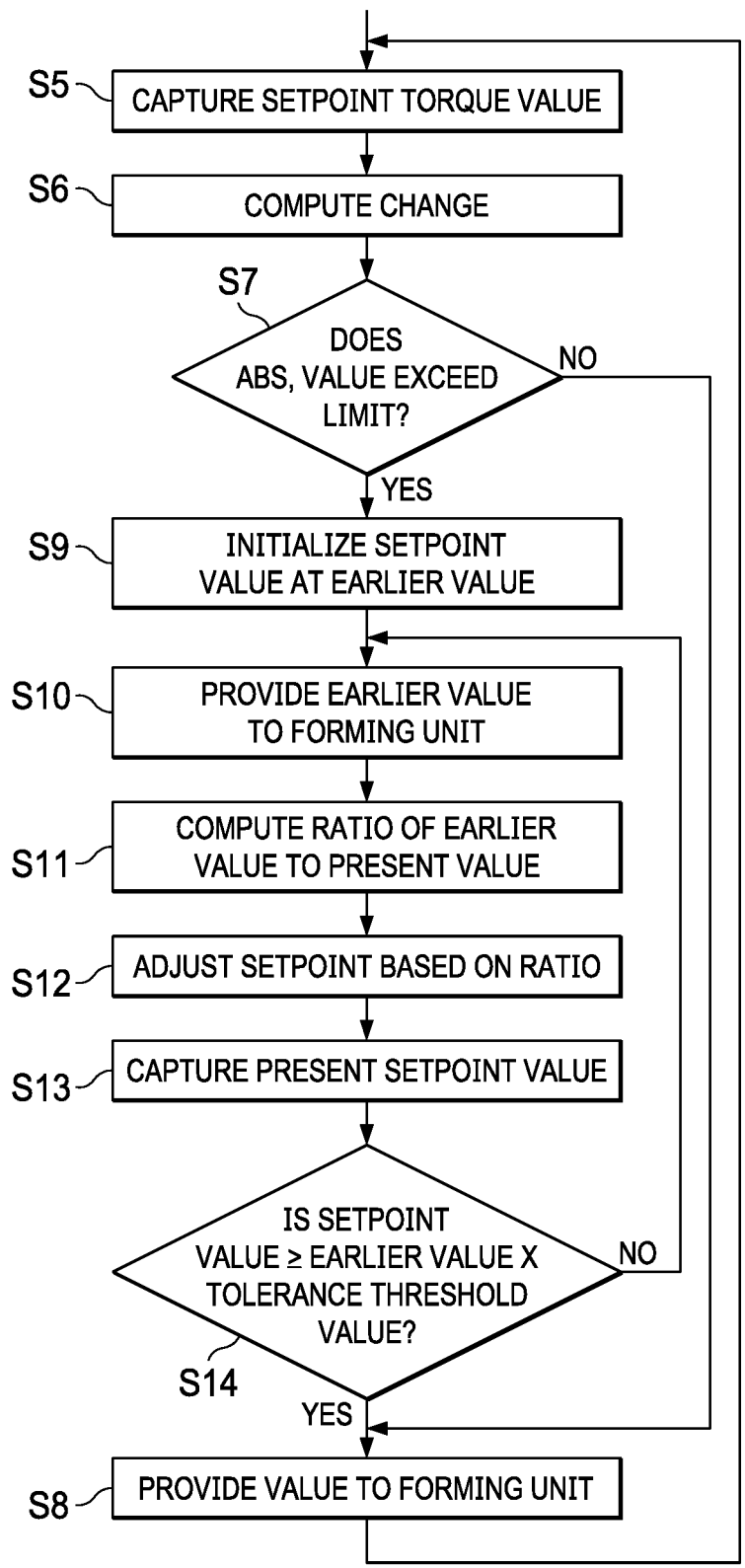
FIG. 5 shows a second embodiment of a method.

FIG. 5 shows a second embodiment of a method for the field-oriented control of an electric motor for driving a vehicle by means of a motor controller having a setpoint current value forming unit. In this case, the setpoint current value forming unit is configured to receive a setpoint torque value as an input signal and to output a torque-forming setpoint current value and at least one field-forming setpoint current value as output signals in order to control the electric motor on a field-oriented basis. In step S5, a present setpoint torque value is captured. Based on the present setpoint torque value and an earlier setpoint torque value, a change is computed in step S6. In step S7, a check is performed to determine whether an absolute value of the change exceeds a prescribed threshold value. Should this not be the case, the method branches to step S8 and the present setpoint torque value is supplied to the setpoint current value forming unit as an input signal. The method then returns to step S5.

Should step S7 identify that the absolute value of the change exceeds the prescribed threshold value, an exception situation is identified and the method branches to step S9, in which the frozen setpoint torque value is initialized at the earlier setpoint torque value. In step S10, this frozen setpoint torque value is supplied to the setpoint current value forming unit as an input signal.

In step S11, a ratio between the frozen and present setpoint torque values is computed, and the torque-forming setpoint current value that is output by the setpoint current value forming unit is adjusted based on the ratio between the frozen and present setpoint torque values in step S12. In step S13, a present setpoint torque value is then captured again.

In step S14, a check is performed to determine whether the present setpoint torque value is greater than or equal to a product of a frozen setpoint torque value and a lower tolerance threshold value.

If the present setpoint torque value is simultaneously less than or equal to a product of the frozen setpoint torque value and an upper tolerance threshold value, it is assumed that an exception situation no longer obtains. In this case, the method branches to step S8. Otherwise, the method returns to step S10. The lower tolerance threshold value used can be 99%, 98%, 95% or 90%, for example. Accordingly, the upper tolerance threshold value could be 101%, 102%, 105% or 110%, for example.

The explanations provided with reference to the figures are intended to be understood to be purely illustrative and nonlimiting. Many changes can be made to the embodiments shown without departing from the scope of protection of the present invention as stipulated in the attached claims.

LIST OF REFERENCE SYMBOLS

1 Setpoint current value forming unit
2 Field-oriented control device
3 Setpoint torque value retaining device
4 Exception situation identification device
5 Ratio computation device
6 Adjusting device
7 Ordinate axis on which the setpoint torque value T is plotted
8 Abscissa axis for representing time
9 Ordinate axis on which the ratio $T_{ratio}$ is plotted
10 Abscissa axis for representing time
$I_q$ Torque-forming setpoint current value
$I_q'$ Adjusted torque-forming setpoint current value $I_d$ Field-forming setpoint current value
T Setpoint torque value
T' Frozen setpoint torque value
t1 Instant 1
t2 Instant 2
$T_{ratio}$ Ratio between the frozen and present setpoint torque values
D1 Domain with fast computation
D2 Domain with slow computation
D3 Domain with fast computation
S1 Capture of a present setpoint torque value
S2 Computation of a change
S3 Identification of an exception situation when an absolute value of the change exceeds a prescribed threshold value
S4 Adjustment of the torque-forming setpoint current value based on the present setpoint torque value, by bypassing the setpoint current value forming unit, when the exception situation is identified
S5 Capture of a present setpoint torque value
S6 Computation of a change
S7 Absolute value of the change greater than a prescribed threshold value?
S8 Supply of the present setpoint torque value to the setpoint current value forming unit as an input signal
S9 Initialization of the frozen setpoint torque value at an earlier setpoint torque value
S10 Supply of the frozen setpoint torque value to the setpoint current value forming unit as an input signal
S11 Computation of a ratio between the frozen and present setpoint torque values
S12 Adjustment of the torque-forming setpoint current value that is output by the setpoint current value forming unit by the ratio between the frozen and present setpoint torque values
S13 Capture of a present setpoint torque value
S14 Frozen setpoint torque value*lower tolerance threshold value≤present setpoint torque value≤frozen setpoint torque value*upper tolerance threshold value?

What is claimed is:

1. A motor controller for field-oriented control of an electric motor for driving a vehicle, the motor controller comprising:
a setpoint current value forming unit configured to:
receive a torque setpoint value as an input signal, and
output a torque-forming current setpoint value and at least one field-forming current setpoint value as output signals to control the electric motor on a field-oriented basis, and
an exception situation identification device configured to:
capture a present torque setpoint value,
compute a change between the present torque setpoint value and an earlier torque setpoint value, and
identify an exception situation when an absolute value of the change exceeds a prescribed threshold value,
wherein the motor controller adjusts the torque-forming current setpoint value based on the present torque setpoint value by bypassing the setpoint current value forming unit, in response to identifying the exception situation.

2. The motor controller of claim 1, having a torque setpoint value retaining device configured to:
supply the present torque setpoint value to the current setpoint value forming unit as an input signal in response to the exception situation identification device not identifying an exception situation, and
supply a frozen torque setpoint value to the current setpoint value forming unit as an input signal when the exception situation identification device identifies the exception situation, wherein the frozen torque setpoint value is initialized at the earlier torque setpoint value.

3. The motor controller of claim 2, wherein the torque setpoint value retaining device is configured to keep the frozen torque setpoint value constant or to adjust the frozen torque setpoint value based on the present torque setpoint value.

4. The motor controller of claim 2, wherein the exception situation identification device is configured to identify that an exception situation no longer obtains when the present torque setpoint value is within a tolerance range around the frozen torque setpoint value.

5. The motor controller of claim 2, further comprising a ratio computation device configured to compute a ratio between the frozen and present torque setpoint values.

6. The motor controller of claim 5, further comprising an adjusting device configured to adjust the torque-forming current setpoint value output by the current setpoint value forming unit by the ratio between the frozen and present torque setpoint values.

7. A method for the field-oriented control of an electric motor for driving a vehicle using a motor controller, comprising: a current setpoint value forming unit receiving a torque setpoint value as an input signal; and outputting a torque-forming current setpoint value and at least one field-forming current setpoint value as output signals to control the electric motor on a field-oriented basis, and an exception situation identification device implementing the method of:
capturing a present torque setpoint value,
computing a change between the present torque setpoint value and an earlier torque setpoint value,
identifying an exception situation when an absolute value of the change exceeds a prescribed threshold value, and
adjusting, by the motor controller, the torque-forming current setpoint value based on the present torque setpoint value by bypassing the setpoint current value forming unit, in response to identifying the exception situation.

8. The method of claim 7, further comprising:
supplying the present torque setpoint value to the current setpoint value forming unit as an input signal in response to an exception situation not being identified, and
supplying a frozen torque setpoint value to the current setpoint value forming unit as an input signal in response to the exception situation being identified, wherein the frozen torque setpoint value is initialized at the earlier torque setpoint value.

9. The method of claim 8, wherein adjusting the torque-forming current setpoint value by bypassing the current setpoint value forming unit comprises computing a ratio between the frozen and present torque setpoint values.

10. The method of claim 9, wherein adjusting the torque-forming current setpoint value by bypassing the current setpoint value forming unit comprises adjusting the torque-forming current setpoint value output by the current setpoint value forming unit by the ratio between the frozen and present torque setpoint values.

11. A vehicle, comprising:
an electric motor; and
a motor controller for field-oriented control of the electric motor, the motor controller comprising:
a current setpoint value forming unit configured to:
receive a torque setpoint value as an input signal, and output a torque-forming current setpoint value and at least one field-forming current setpoint value as output signals to control the electric motor on a field-oriented basis, and an exception situation identification device configured to:
  capture a present torque setpoint value,
  compute a change between the present torque setpoint value and an earlier torque setpoint value, and
  identify an exception situation when an absolute value of the change exceeds a prescribed threshold value,
  wherein the motor controller adjusts the torque-forming current setpoint value based on the present torque setpoint value, by bypassing the current setpoint value forming unit, in response to the exception situation being identified.

12. The vehicle of claim 11, wherein the motor controller further comprises a torque setpoint value retaining device configured to:
  supply the present torque setpoint value to the current setpoint value forming unit as an input signal in response to the exception situation identification device not identifying an exception situation, and
  supply a frozen torque setpoint value to the current setpoint value forming unit as an input signal when the exception situation identification device identifies the exception situation, wherein the frozen torque setpoint value is initialized at the earlier torque setpoint value.

13. The vehicle of claim 12, wherein the torque setpoint value retaining device of the motor controller is configured to keep the frozen torque setpoint value constant or to adjust the frozen torque setpoint value based on the present torque value.

14. The vehicle of claim 12, wherein the exception situation identification device of the motor controller is configured to identify that an exception situation no longer obtains when the present torque setpoint value is within a tolerance range around the frozen torque setpoint value.

15. The vehicle of claim 12, wherein the motor controller further comprises a ratio computation device configured to compute a ratio between the frozen and present torque setpoint values.

16. The vehicle of claim 15, wherein the motor controller further comprises an adjusting device configured to adjust the torque-forming current setpoint value output by the current setpoint value forming unit by the ratio between the frozen and present torque setpoint values.

* * * * *